United States Patent [19]

Oka et al.

[11] Patent Number: 5,495,456
[45] Date of Patent: Feb. 27, 1996

[54] MAGNETO-OPTICAL RECORDING AND REPRODUCING APPARATUS HAVING A LASER DRIVING CIRCUIT WHICH SUPERIMPOSES A SIGNAL HAVING A FREQUENCY AT LEAST DOUBLE THE MAXIMUM RECORDING SIGNAL FREQUENCY

[75] Inventors: Nobuyuki Oka, Kanagawa; Takayuki Asahina, Shizuoka, both of Japan

[73] Assignee: Sony Corporation, Tokyo, Japan

[21] Appl. No.: 310,564

[22] Filed: Sep. 22, 1994

[30] Foreign Application Priority Data

Sep. 29, 1993 [JP] Japan ................... 5-242442

[51] Int. Cl.$^6$ .................................................. G11B 11/00
[52] U.S. Cl. .............................................. 369/13; 360/114
[58] Field of Search ............................ 369/13, 112, 116, 369/14; 360/46, 114, 59; 365/122

[56] References Cited

U.S. PATENT DOCUMENTS

| | | | |
|---|---|---|---|
| 4,882,718 | 11/1989 | Kryder et al. | 369/13 |
| 4,888,750 | 12/1989 | Kryder et al. | 369/13 |
| 5,144,602 | 9/1992 | Kudoh et al. | 369/13 |
| 5,184,335 | 2/1993 | Kryder et al. | 369/13 |
| 5,361,247 | 11/1994 | Fuji et al. | 369/48 |

FOREIGN PATENT DOCUMENTS

| | | |
|---|---|---|
| 0120389A3 | 10/1984 | European Pat. Off. . |
| 0316188A3 | 5/1989 | European Pat. Off. . |
| 0428321A3 | 5/1991 | European Pat. Off. . |

OTHER PUBLICATIONS

Patent Abstracts of Japan, vol. 17, No. 605 (P–1639), 8 Nov. 1993 & JP–A–05 182 284 (Canon Inc), 23 Jul. 1993.
Patent Abstracts of Japan, vol. 18, No. 159 (P–1711), 16 Mar. 1994 & JP–A–05 325 294 (Canon Inc.), 10 Dec. 1993.
Patent Abstracts of Japan, vol. 17, No. 78 (P–1488), 16 Feb. 1993 & KP–A–04 281 217 (Ricoh Co Ltd.), 6 Oct. 1992.
Patent Abstracts of Japan, vol. 16, No. 155 (P–1338), 16 Apr. 1992 & JP–A–04 006 635 (Canon Inc), 10 Jan. 1988.
Patent Abstracts of Japan, vol. 14, No. 303 (P–1070), 29 Jun. 1990 & JP–A–02 096 954 (Fujitsu Ltd.), 9 Apr. 1990.
Patent Abstracts of Japan, vol. 17, No. 491 (P–1607), 6 Sep. 1993 & JP–A–05 120 753 (Sharp Corp.), 18 May 1993.
Patent Abstracts of Japan, vol. 13, No. 64 (P–827), 14 Feb. 1989 & JP–A–63 251 946 (Pioneer Electronic Corp), 19 Oct. 1988.

Primary Examiner—Georgia Y. Epps
Assistant Examiner—Tan Dinh
Attorney, Agent, or Firm—Limbach & Limbach; Philip M. Shaw, Jr.

[57] ABSTRACT

A recording and/or reproducing apparatus for a magneto-optical recording medium includes a semiconductor laser device for radiating a laser beam to the magneto-optical recording medium, a driving circuit for supplying a driving signal to the semiconductor laser device, a first oscillating circuit for generating first high-frequency signals superposed on the driving signal from the driving circuit during recording on the magneto-optical recording medium, and a second oscillating circuit for generating second high-frequency signals superposed on the driving signal from the driving circuit during reproduction from the magneto-optical recording medium. The first high-frequency signals are of a frequency twice the maximum recording frequency or higher, and the second high-frequency signals are of a frequency different from that of the first high-frequency signals. The semiconductor laser device is fed during recording and during reproduction with signals which are the driving signals from the driving circuit superposed on by the first high frequency signals from the first oscillating circuit and with signals which are the driving signals from the driving circuit superposed on by the second high frequency signals.

8 Claims, 9 Drawing Sheets

MAGNETO-OPTICAL RECORDING AND REPRODUCING APPARATUS HAVING A LASER DRIVING CIRCUIT WHICH SUPERIMPOSES A SIGNAL HAVING A FREQUENCY AT LEAST DOUBLE THE MAXIMUM RECORDING SIGNAL FREQUENCY

BACKGROUND OF THE INVENTION

1. Field of the Invention

This invention relates to a recording apparatus for recording desired information signals on a magneto-optical recording medium by applying a magnetic field and simultaneously radiating a light beam to the magneto-optical recording medium, using a semiconductor laser device as a light source radiating the light beam.

2. Description of the Related Art

As a recording medium for recording the information signals, a magneto-optical disc has hitherto been employed, in which the magneto-optical effects are utilized for recording the information signals. The information signal recording system, employing such a magneto-optical disc as the recording medium, is the magnetic field modulation system in which the direction of the magnetic field to be applied to the disc is modulated in accordance with the information signals desired to be recorded on the disc.

With a information signal recording system employing the magnetic field modulation system, a light beam emanated from a semiconductor laser is continuously radiated on the magneto-optical disc for heating a magnetic film area of the magneto-optical disc in which to record the information signals in order to decrease the coercivity of the magnetic film area in which to record the signals. An external magnetic field, having the direction of the magnetic field modulated in accordance with the information signals desired to be recorded, is applied to the magnetic film area of the magneto-optical disc decreased in coercivity with the aid of an electro-magnet. The direction of the magnetic film of the magneto-optical disc area with decreased coercivity is changed for recording the desired information signals.

For reproducing the information signals, thus recorded on the magneto-optical disc as changes in the direction of magnetization, the Kerr effect or the Faraday effect, relating to the interaction between the light and the magnetism, is utilized. When a light beam is incident on a magnetized member in a direction parallel to its direction of magnetization, the plane of polarization of the reflected light and that of the transmitted light are rotated by angles of rotation which are the Kerr rotation angle and the Faraday angle of rotation, respectively. If the direction of the magnetic domains differs with respect to the light incident direction, a difference in the direction of rotation is produced. The difference in the direction of the Kerr rotation angle of the reflected light is read for reproducing the information signals.

For such reproduction, there is induced a phenomenon in which the semiconductor laser undergoes self oscillation to increase the output light by the reflected light from the disc surface being fed back to the semiconductor laser. An optical pickup device of the type in which such phenomenon is positively utilized so that information signals on the magneto-optical disc are detected from changes in an output light of the semiconductor laser caused by the reflected feedback light is called the self-coupled optical pickup (SCOOP).

With the SCOOP, a smaller number of component parts suffices, while the device may be reduced in size, weight and cost. However, it suffers from noise generated in the semiconductor laser by the reflected light being fed back to the semiconductor laser which is the light source. This noise is termed hereinafter as the SCOOP noise. Of course, such SCOOP noise is produced in an optical pickup device other than the SCOOP, that is an optical pickup device not utilizing the phenomenon of self oscillation of the semiconductor laser device by the reflected light.

The SCOOP noise is produced by the fact that the semiconductor laser oscillated in a single longitudinal mode by dc current driving is oscillated in a multiple longitudinal mode due to the feedback reflected light from the magneto-optical disc accompanied by minute displacement. Such single longitudinal mode oscillation and multiple longitudinal mode oscillation are induced alternately depending on the state of displacement of the magneto-optical disc. A larger laser output light and a smaller laser output light are generated during the single longitudinal mode oscillation and the multiple longitudinal mode oscillation, respectively.

The SCOOP noise is generated by the semiconductor laser being oscillated in the single longitudinal mode or in the multiple longitudinal mode by the reflected feedback from the magneto-optical disc to deteriorate reproduction of the information signals.

Thus it has been contemplated to superpose the high frequency superposition current shown in FIG. 11 on the driving current for the semiconductor laser during reproduction, as indicated in FIG. 11. The high frequency superposition current has completely ON periods and completely OFF periods, as shown in FIG. 13. Consequently, should such high frequency superposition current superposed on the driving current be used for driving the semiconductor laser, the semiconductor laser is oscillated in a multiple longitudinal mode by on/off control. The light output of the semiconductor laser oscillated in a multiple longitudinal mode is smoothly changed against displacement of the magneto-optical disc to suppress the SCOOP noise.

On the other hand, the SCOOP noise has hitherto not been taken into account when recording information signals by magnetic field modulation as discussed above. The reason is that the laser light output radiated during recording on the magneto-optical disc from the semiconductor laser is of a high power and hence was not thought to be affected significantly by the SCOOP noise.

The system of recording information signals using the magnetic field modulation system is explained by referring to FIG. 1.

In this figure, the laser light radiated by a semiconductor laser device 51, having its oscillation power controlled by automatic power control (APC) by an automatic power control (APC) circuit 52, is detected by a photodiode 54 constituting an I-V converter 53 along with a resistor 55. The photodiode 54 is arranged facing the front side of the semiconductor laser device 51, and detects part of the laser light beam split by an optical system, such as a beam splitter.

Meanwhile, when recording information signals on the magneto-optical disc by magnetic field modulation, the SCOOP noise slightly changes a light output of the recording semiconductor laser device. Such change in the laser light output will produce fluctuations in the positions of the modulated perpendicular magnetic field. These fluctuated modulated magnetic field positions represent the optical jitter.

The generation of such jitter is explained by referring to FIGS. 1 and 2.

It is now assumed that the semiconductor laser device 51 is driven by the APC circuit 52, and the laser light L outputted from the semiconductor laser device 51 is detected by the photodiode 54 of the I-V converter 53, as shown in FIG. 1. If the SCOOP noise is produced by the semiconductor laser device 51, random power fluctuations, that is jitter, continuing for 1 to 10 μsec and occasionally for 20 μsec, are generated, as shown in FIG. 2.

Such jitter during recording leads to error rate deterioration during reproduction which is ascribable to recording-related factors. For reproducing digitally recorded information signals, it is necessary to extract PLL clocks. However, if the jitter is produced, the PLL cocks tend to follow the jitter, so that errors on the time axis, that is timing errors and hence PLL clock extraction errors are produced.

OBJECT AND SUMMARY OF THE INVENTION

In view of the above-described status of the art, it is an object of the present invention to provide a magneto-optical recording device in which output fluctuations in the recording laser light by the SCOOP noise may be distributed and fluctuations in the modulated positions of the magnetic field during recording may be suppressed in order to obviate deterioration in the error rate ascribable to recording-related factors.

In its one aspect, the present invention provides a recording apparatus for a magneto-optical recording medium comprising a semiconductor laser device for radiating a laser beam to the magneto-optical recording medium, a driving circuit for supplying a driving signal to the semiconductor laser device, and an oscillating circuit for generating high-frequency signals superposed on the driving signal from the driving circuit. The high-frequency signals are of a frequency twice the maximum recording frequency or higher. The semiconductor laser device is fed with a signal which is the driving signal from the driving circuit superposed on by high-frequency signals from the oscillating circuit.

In another aspect, the present invention provides a recording and/or reproducing apparatus for a magneto-optical recording medium including a semiconductor laser device for radiating a laser beam to the magneto-optical recording medium, a driving circuit for supplying a driving signal to the semiconductor laser device, a first oscillating circuit for generating first high-frequency signals superposed on the driving signal from the driving circuit during recording on the magneto-optical recording medium, and a second oscillating circuit for generating second high-frequency signals superposed on the driving signal from the driving circuit during reproduction from the magneto-optical recording medium. The first high-frequency signals are of a frequency twice the maximum recording frequency or higher, and the second high-frequency signals are of a frequency different from that of the first high-frequency signals. The semiconductor laser device is fed during recording and during reproduction with signals which are the driving signals from the driving circuit superposed on by the first high frequency signals from the first oscillating circuit and with signals which are the driving signals from the driving circuit superposed on by the second high frequency signals from the second oscillating circuit, respectively. During recording, a perpendicular magnetic field modulated in accordance with recording data is applied to the magneto-optical recording medium and simultaneously a light beam is radiated on the recording medium for recording data thereon. During reproduction, as a light beam is radiated to the magneto-optical recording medium, data recorded on the magneto-optical recording medium are read out based on the return light from the recording medium.

DESCRIPTION OF THE PREFERRED EMBODIMENTS

Figure 1:
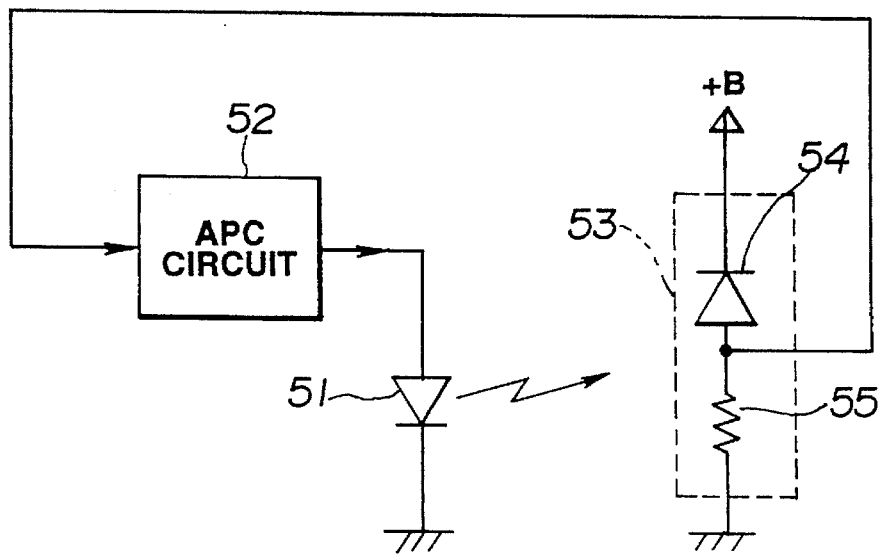
FIG. 1 is a schematic view showing an arrangement of a conventional magneto-optical recording device.
Figure 2:
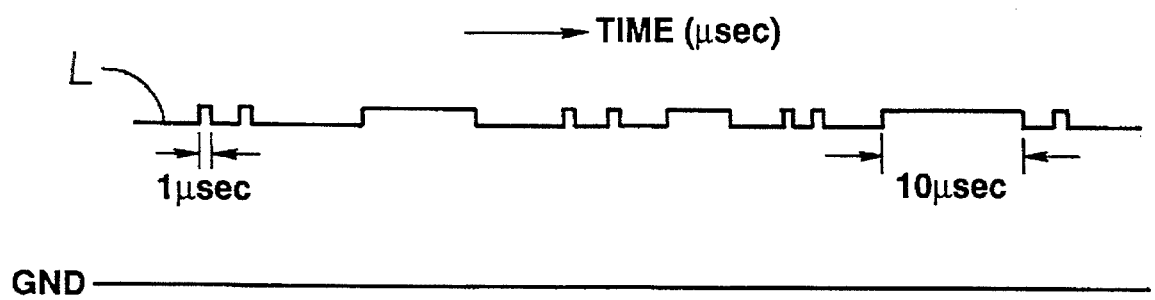
FIG. 2 illustrates jitter generation in the presence of the SCOOP noise.

Referring to the drawings, two illustrative embodiments of the magneto-optical recording device according to the present invention are explained in detail.

The first embodiment is directed to a magneto-optical recording device for recording information signals on a magneto-optical recording disc by magnetic field modulation. For magnetic field modulation, a laser beam is continuously radiated to a magneto-optical disc from a semiconductor laser device as a light source. That is, in recording the information signals with the present first embodiment, a laser beam is continuously radiated from the semiconductor laser device to the magneto-optical disc for decreasing the coercivity by the heat generated by the laser beam and the direction of magnetization is changed by an electro-magnet as an external magnetic field.

Figure 3:
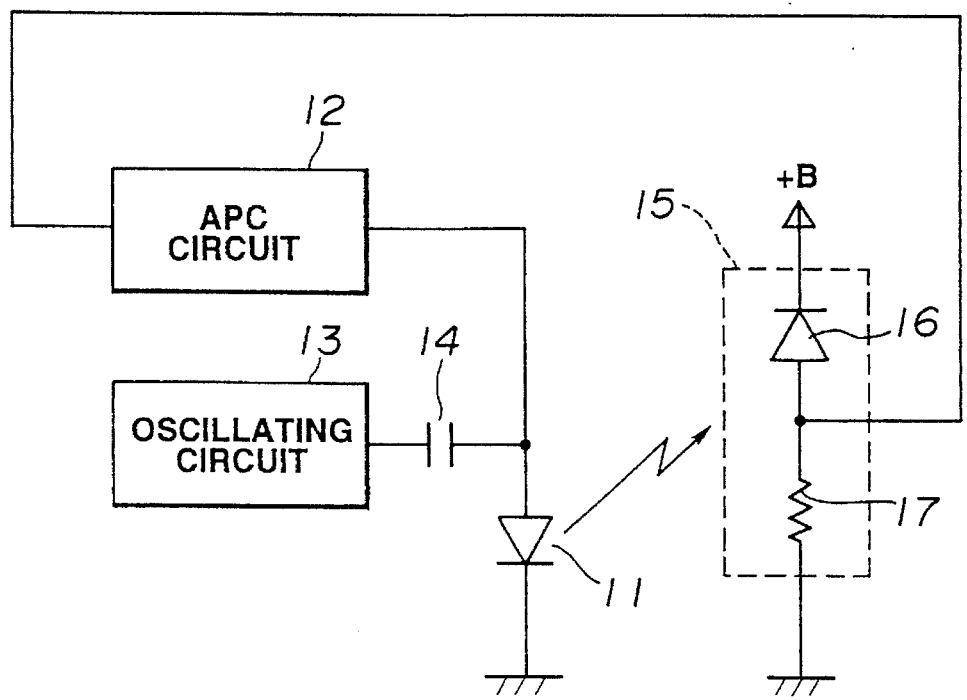
FIG. 3 is a schematic view showing a first embodiment of a magneto-optical recording device according to the present invention.

The first embodiment has a semiconductor laser device 11 as a light source for radiating a recording laser beam on a magneto-optical disc, as shown in FIG. 3. The semiconductor laser device 11 is controlled by an automatic power controlling circuit (APC circuit) 12 so that its output laser light power will be constant. To the semiconductor laser device 11 is connected an oscillating circuit 13 for oscillating a superposition signal via coupling capacitor 14.

The oscillating circuit 1B generates the superposition signal which is superposed on adc driving signal supplied from the APC circuit 12 to the semiconductor laser device 11. The superposition signal has a frequency equal to twice the maximum recording frequency or higher and preferably equal to 5 MHz or higher.

Thus, for radiating a laser beam, the semiconductor laser device 11 is driven by the driving signal superposed on by the superposition signal having the frequency equal to twice the maximum recording frequency or higher and preferably 5 MHz or higher, referred to hereinafter as the superposed driving signal.

The reflected light from a magneto-optical disc, not shown, is fed back to the semiconductor laser device 11. The laser beam radiated on the magneto-optical disc is employed for heating the disc location to which the magnetic field is applied.

However, the portion of the light beam radiated on the magneto-optical disc and reflected back from the disc surface and the recording layer is fed back via the optical system of the optical pickup device to the semiconductor laser device 11.

The reflected light fed back to the semiconductor laser device 11 causes self-oscillation of the semiconductor laser device 11 itself. Such self-oscillation of the semiconductor laser device 11 leads to generation of the SCOOP noise. Since the superposed driving signal superposed on by the superposition signal having the frequency of 5 MHz or higher is supplied to the semiconductor laser device 11, as described above, the semiconductor laser device 11 may be set into oscillations only in the multiple longitudinal mode, thus making it possible to suppress generation of the SCOOP noise.

The semiconductor laser device 11 driven by the superposed driving signal radiates the recording laser light to the magneto-optical disc. Part of the radiated laser light is fed to the photodiode 18 making up the I-V converter 15 along with the resistor 17 for detecting the light volume.

The power control by the APC circuit 12 is adjusted by the light volume value as detected by the photodiode 16.

Figure 4:
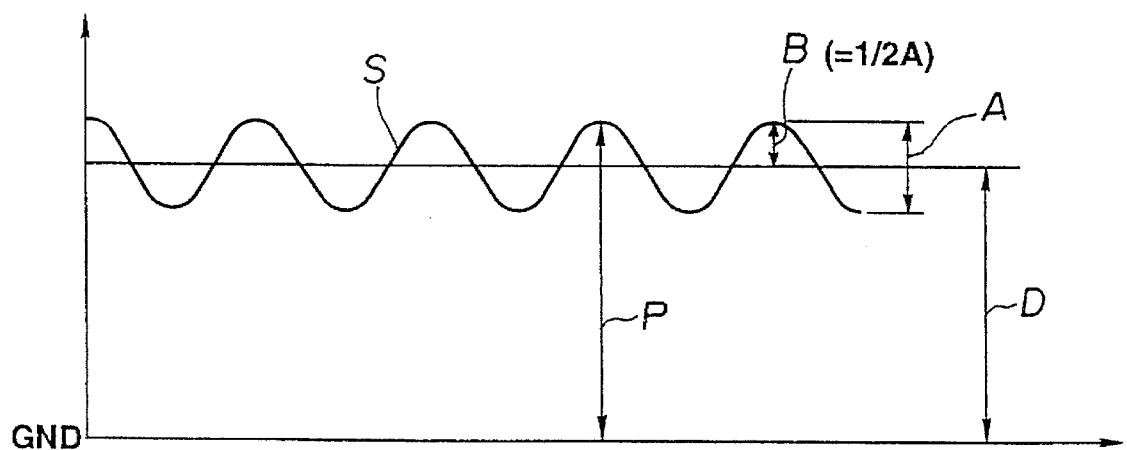
FIG. 4 illustrates a superposed signal employed in the recording device shown in FIG. 3.
Figure 5:
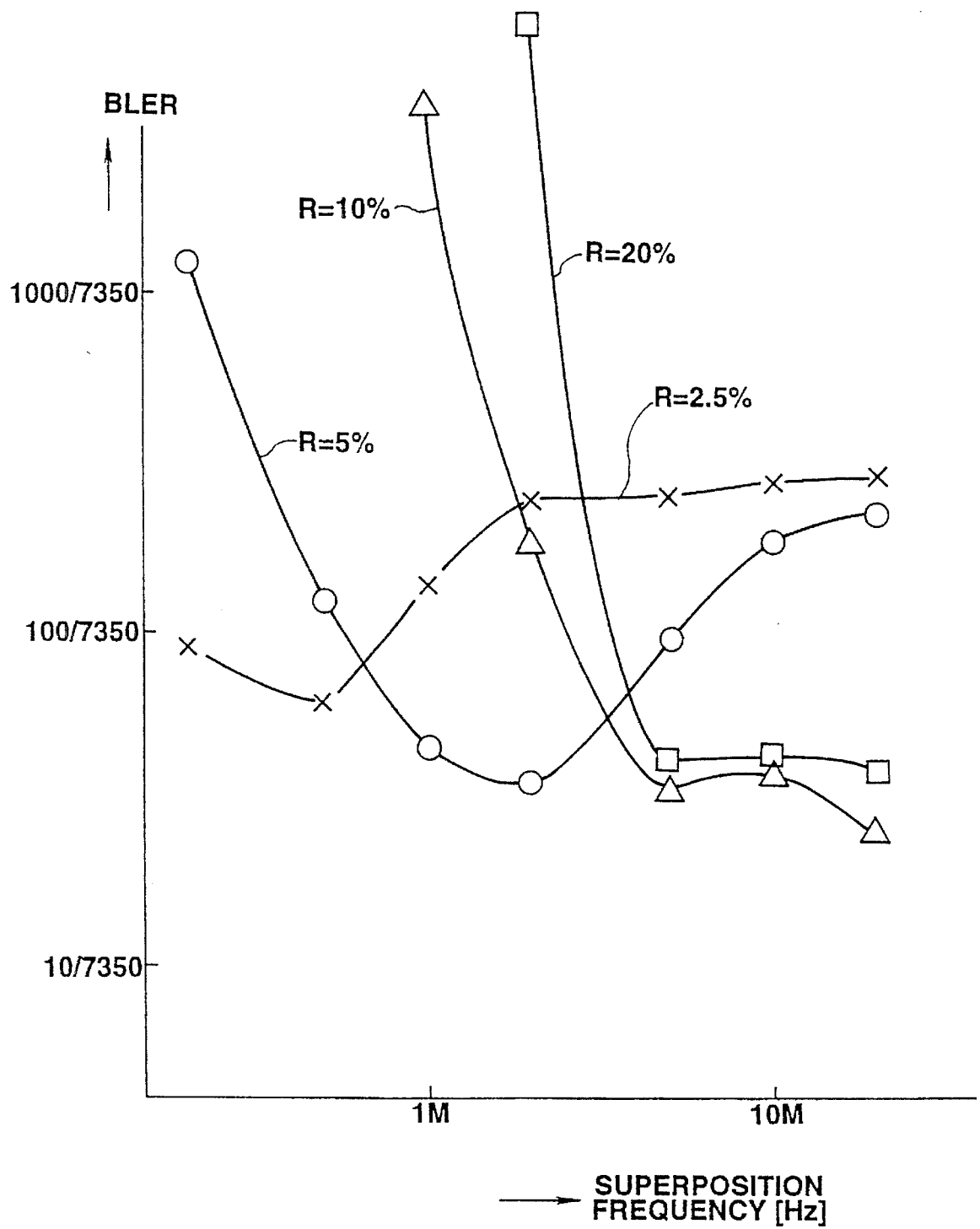
FIG. 5 is a graph showing the relation between the superposition frequency of the superposed signals and the block error rate (BLER) for various values of the superposition ratio.

Referring to FIGS. 4 and 5, the superposition signal generated by the oscillating circuit 1B is explained.

The superposition signal has the waveform as shown in FIG. 4.

That is, the superposition signal generated by the oscillating circuit 13 is a continuous signal devoid of demarcation between the on-domain and the off-domain, as shown in FIG. 4.

Thus the superposed driving signal is a signal modulated with shallow modulation, that is a signal whose dc peak level is fluctuated in the manner of an alternating current by the superposition signal as shown in FIG. 4.

Specifically, the superposition signal may have its superposition frequency and superposition level determined by the characteristics shown in FIG. 5.

The curves shown in FIG. 5 show changes in the block error rate (BLER), with the superposition frequency and the superposition ratio based on the superposition level as parameters, with the use of an optical pickup capable of correcting data of 450 blocks per second during usual recording and reproduction. In FIG. 5, the superposition frequency and the BLER are plotted on the abscissa and on the ordinate, respectively.

The BLER plotted on the ordinate is first explained.

In general, when recording or reproducing data on or from an optical disc, it may occur that incorrect data are recorded or reproduced under extraneous effects. These incorrect data may be corrected, if to a limited extent, by error correction code during reproduction. The minimum unit of the digital data for correcting the incorrect data is termed a block. The volume of data that can be read by the optical pickup per second is 7350 blocks. Mis-read blocks are corrected.

The block error rate (BLER), that is the block error correction ratio, is given by the number of corrected blocks among the 7350 blocks read out per second.

Thus, with the number of the corrected blocks equal to CI, the BLER is given by

BLER=CI/7350

The superposition ratio, employed as the parameter along with the superposition frequency, indicates the ratio of the superposition light volume relative to the light volume D of the dc component during recording. The superposition ratio is a level B (zero-to-peak or 0–P, referred to hereinafter as superposition 0–P) of the superposition signal S shown in FIG. 4, multiplied by a light volume D of the dc component, divided by 100. It is noted that the level B is one-half a level A (peak-to-peak or P—P, referred to hereinafter as the superposition P—P) of the superposition signal shown in FIG. 4, and that the light volume D of the dc component is detected by the photodiode 16 when the semiconductor laser device 11 is outputting the laser light.

Thus the superposition ratio R is given by $$\begin{aligned} R &= B/D \times 100 \, (\%) \\ &= (\text{superposition } P-P)/2D \times 100 \, (\%) \\ &= (\text{superposition } O-P)/D \times 100 \, (\%) \end{aligned}$$

FIG. 5 shows the results of measurement of the BLER as the superposition frequency is changed, with the superposition ratio R being changed to 2, 5, 5, 10 and 20%.

It is seen from the above results that desirable values of BLER may be obtained for the superposition frequency of 5 MHz or higher and the superposition ratio of from 10% to 20%. The superposition frequency of 5 MHz or higher corresponds to a frequency equal to twice or more of the maximum recording frequency.

As the writing information during writing, EFM signals with the data bit rate ~2.03 Mbits/sec are employed for measuring the BLER. For equating the conditions, BLER= $6.1 \times 10^{-2}$ during usual recording for which low-frequency superposition is not applied. On the other hand, the practical limit of the BLER is given by BLER=$3 \times 10^{-2}$. If this is assumed to be a random error, since each block with EFM is made up of 32 symbols and each symbol is made up of 8 bits, the symbol error=$9.4 \times 10^{-4}$ and the bit error=$1.2 \times 10^{-4}$.

The SCOOP noise is produced in an evidently different manner depending on whether the semiconductor laser device is driven with the superposition frequency and the superposition level (superposition ratio R) obtained from the measured results of FIG. 5 or with the superposition in an off-state.

Figure 6A:
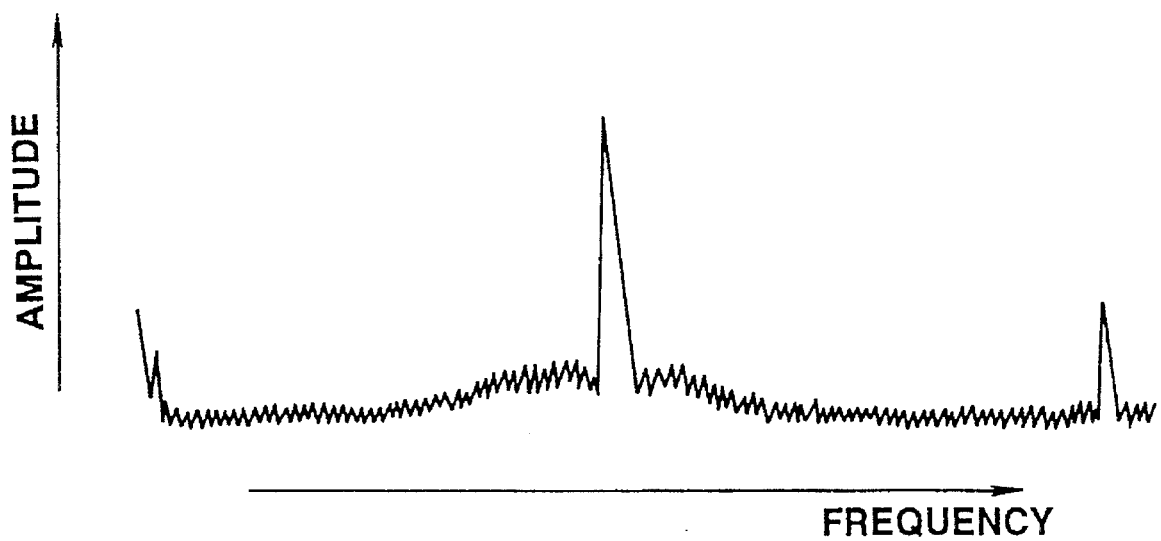
FIGS. 6A and 6B are graphs for illustrating the operation of the first embodiment of the magneto-optical recording device according to the present invention.
Figure 6B:
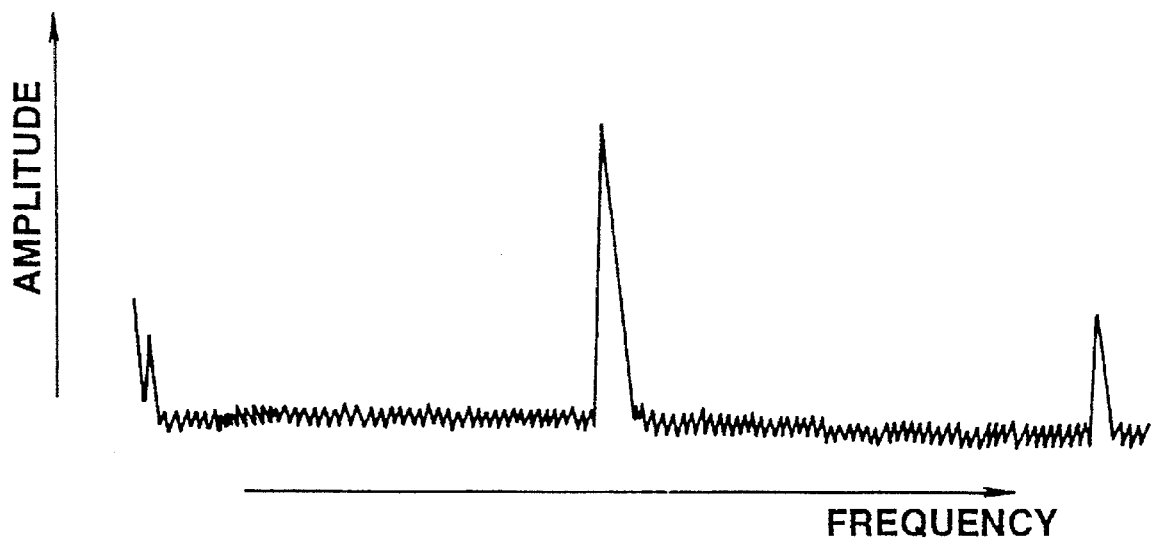

FIGS. 6A and 6B show changes in characteristics between the sole carrier and the noise. In FIGS. 6A and 6B, the carrier oscillation frequency and the amplitude are plotted on the abscissa and on the ordinate, respectively.

FIGS. 6A and 6B illustrate the signal level (amplitude) when the superposition is in the off-state and in the on-state, respectively. There is produced an evident noise level difference between the state shown in FIG. 6B and that shown in FIG. 6A.

Figure 7:
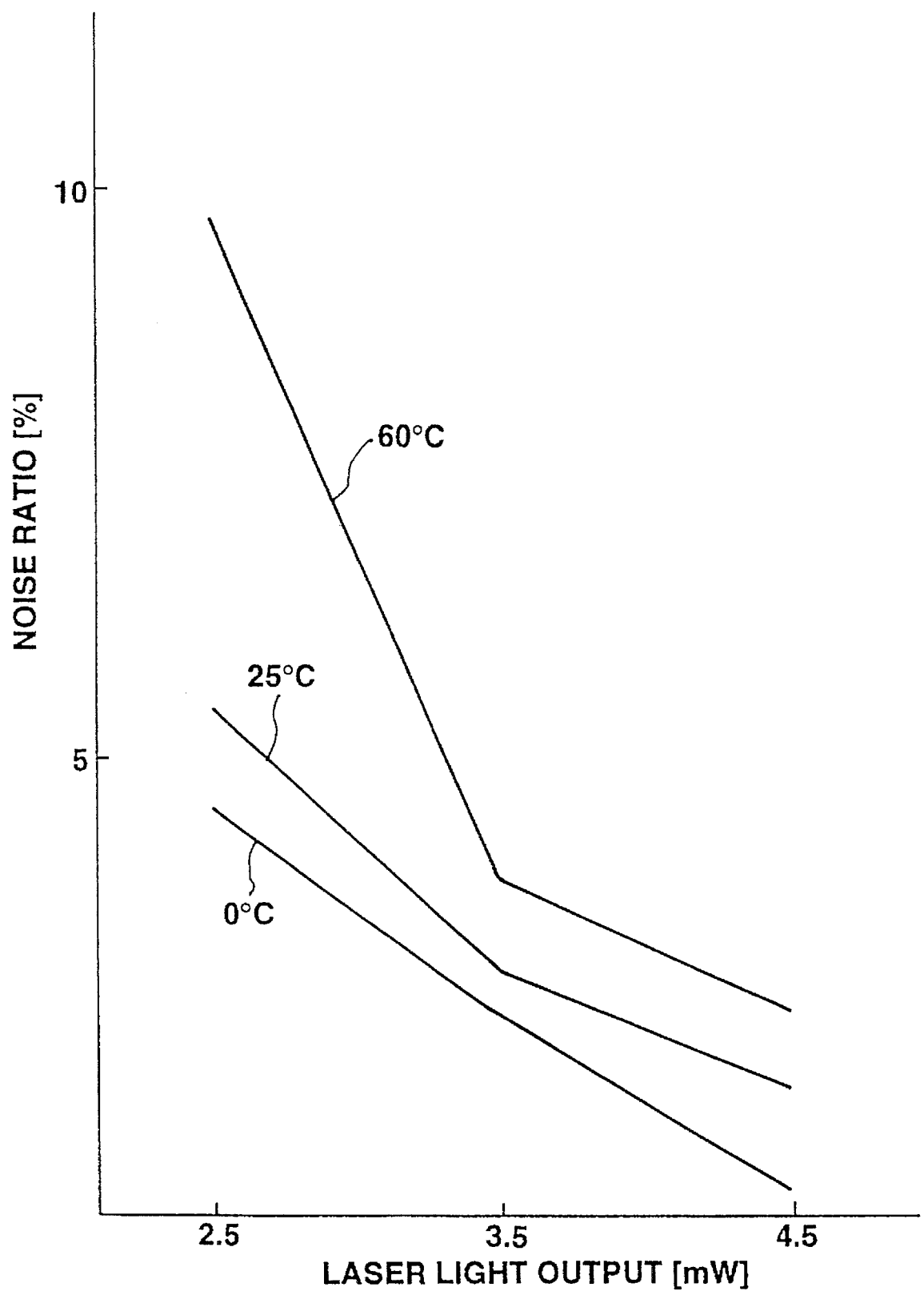
FIG. 7 is a graph showing the relation between the laser light output and the noise ratio.

FIG. 7 shows characteristic noise ratio changes caused for variable laser light output levels and the environmental temperature of the semiconductor laser.

In FIG. 7, the laser light output and the noise ratio are plotted on the abscissa and on the ordinate, respectively. It is seen that the noise ratio is decreased with a rise in the laser light output and that the nose ratio is affected by the environmental temperature of the semiconductor laser. Consequently, with the example of FIG. 7, it is seen that, for suppressing the generation of the SCOOP noise, is necessary for the laser light output to be on the order of 4.5 mW, while it is also necessary for the working environmental temperature not to be an excessively high temperature.

Thus, with the present first embodiment, in which the driving current for the semiconductor laser device 11 is the superposed driving current comprised of the dc component superposed on by the superposition current with the superposition ratio of 10 to 20%, with the superposition frequency of 5 MHz or higher, it becomes possible to distribute output fluctuations of the recording laser light by the SCOOP noise and to suppress fluctuations in the positions of modulation of the magnetic field during recording in order to reduce the deterioration in the error rate ascribable to factors induced during recording.

The recording and/or reproducing apparatus according to a second embodiment of the present invention is now explained.

The second embodiment is directed to an apparatus which not only enables information signals to be recorded by magnetic field modulation on the magneto-optical disc by but also enables the recorded information signals to be reproduced from the disc.

Figure 8:
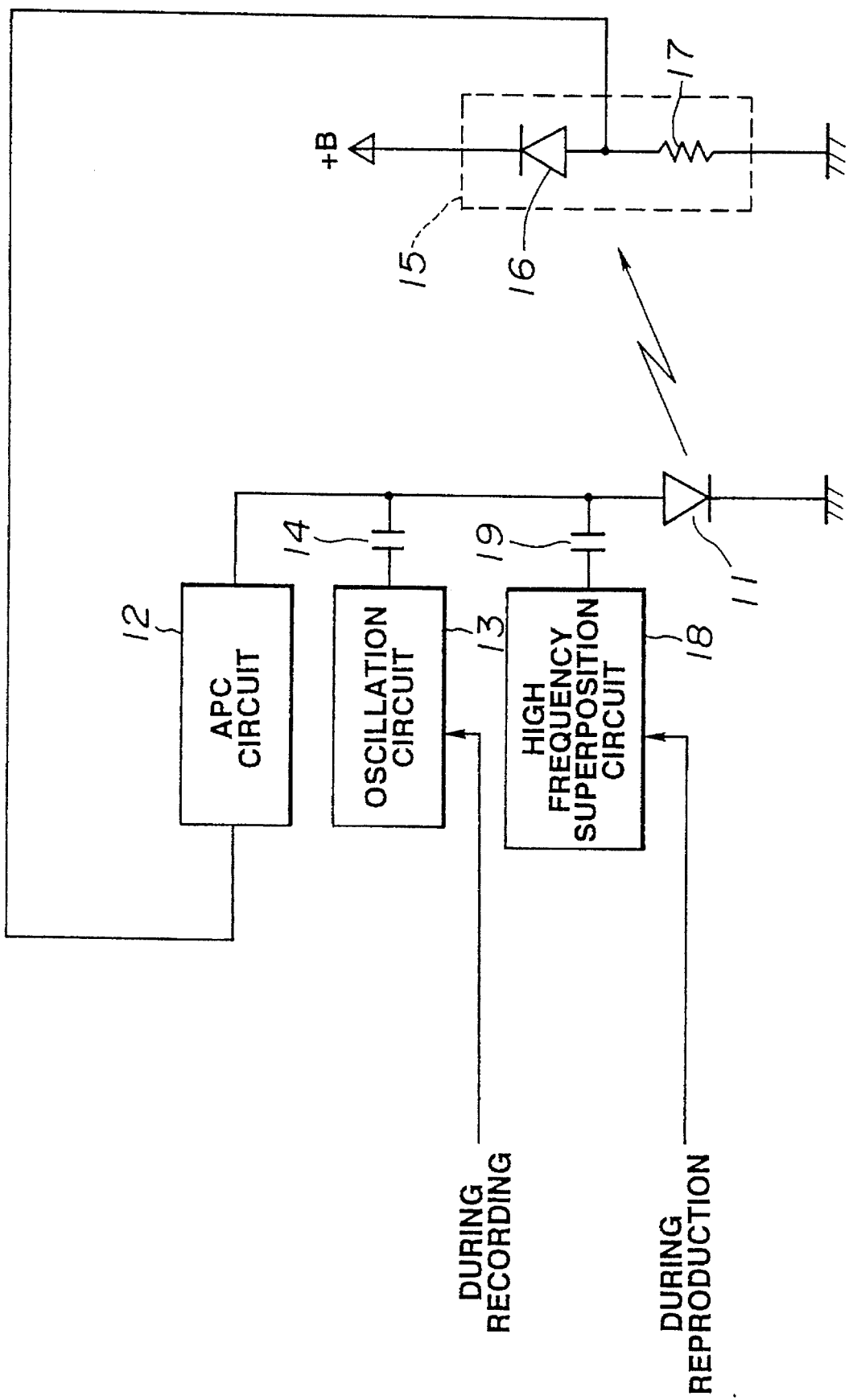
FIG. 8 is a schematic view showing a second embodiment of a magneto-optical recording device according to the present invention.

The second embodiment is now explained by referring to FIG. 8, in which parts or components similar to those shown in FIG. 3 are correspondingly numbered and not specifically described for simplicity.

In the present second embodiment, a semiconductor laser device 11 for radiating a recording laser light on the magneto-optical disc as an information recording medium is employed as a light source.

To the semiconductor laser device 11 are connected an APC circuit 12 and an oscillating circuit 13 via a coupling capacitor 14, as in the previous embodiment. The present embodiment differs from the previous first embodiment in that a high frequency superposition circuit 18 is connected via a coupling capacitor 19 to the semiconductor laser device 11.

Figure 13:
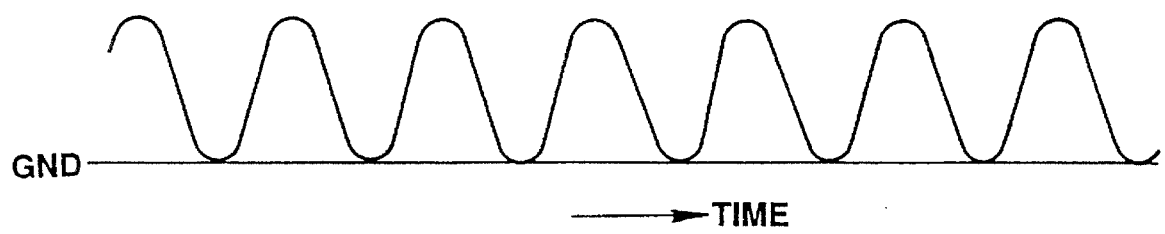
FIG. 13 illustrates a high-frequency superposition current during reproduction.

In the present second embodiment, the high frequency superposition circuit 18 is employed for reproducing the magneto-optical disc. During playback, a superposition signal having a frequency of hundreds of MHz is superposed by the high frequency superposition circuit 18 on the dc driving current from the APC circuit 12, as shown in FIG. 13, under control by a changeover unit, not shown. Of course, the superposition signal has on-domains and off-domains. During recording, the superposition signals in an amount of 10 to 20% in level from the oscillation circuit 13 are superposed on the dc driving current of the APC circuit 12, under control by the changeover unit, not shown, as in the above-described first embodiment.

Thus it is possible with the present second embodiment to suppress the SCOOP noise both during recording and during reproduction.

That is, with the second embodiment, it is possible to suppress jitter during recording as in the first embodiment and to decrease fluctuations in the magnetic field modulating positions during recording, while it is possible to suppress the SCOOP noise during reproduction.

Figure 9:
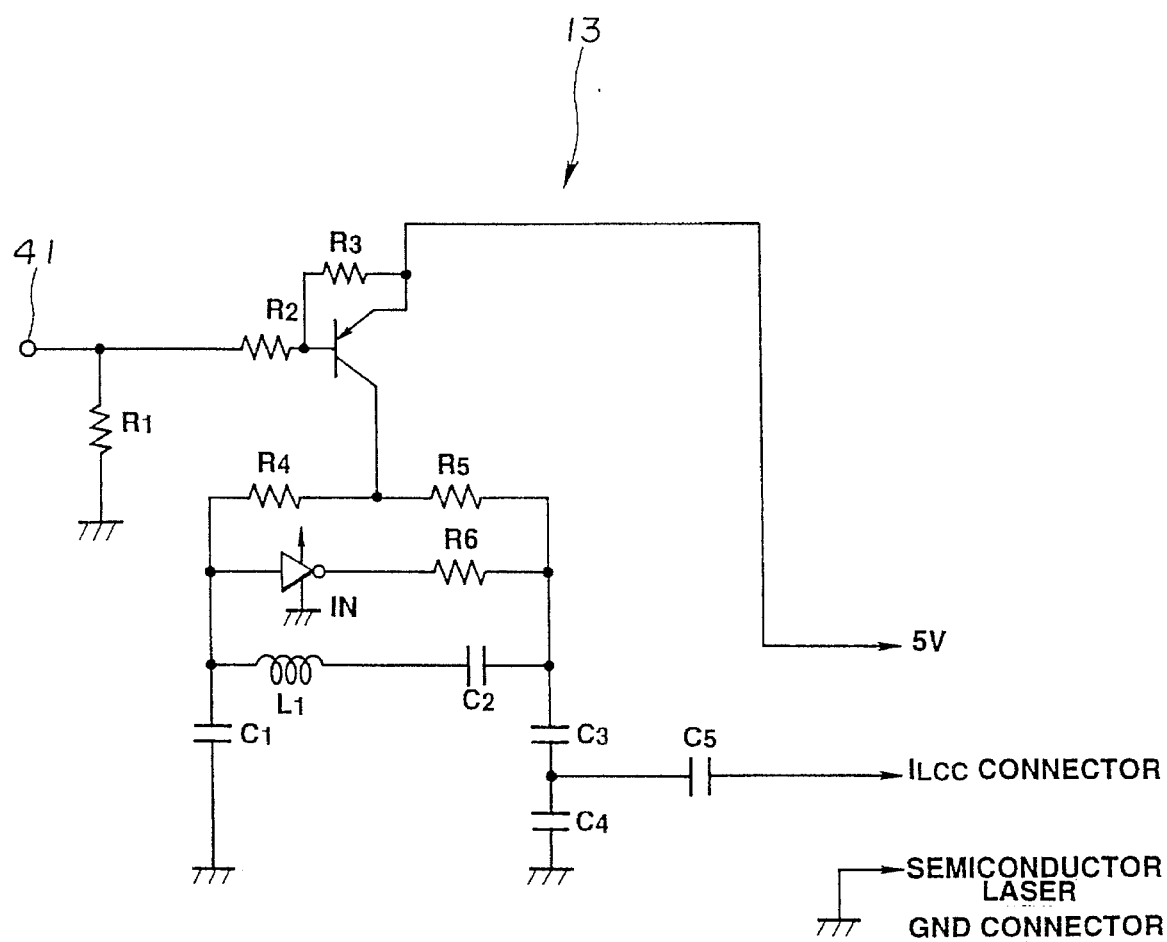
FIG. 9 is a circuit diagram showing a concrete example of a superposition circuit employed in the magneto-optical recording device according to the present invention.

FIG. 9 shows a concrete example of an oscillation circuit 1B employed in the first and second embodiments. The oscillating circuit 13 includes a transistor Tr having a resistor $R_2$ connected to its base and having a resistor $R_3$ connected across its emitter and base, and a circuit connected to the collector of the transistor Tr, that is a circuit comprised of resistors $R_4$, $R_5$ and $R_6$, an invertor IN, a coil $L_1$ and capacitors $C_1$, $C_2$, $C_3$, $C_4$ and $C_5$. The resistor $R_2$ is connected to one end of a resistor $R_1$ the other end of which is grounded.

A collector output of the transistor Tr is supplied to a junction point between the resistors $R_4$ and $R_5$. The circuit connected to the collector of the transistor Tr is comprised of a series circuit consisting of the invertor IN and the resistor $R_6$, and an LC circuit of the coil $L_1$ and the capacitor $C_2$ connected in series with each other and in parallel to the series circuit of the invertor IN and the resistor $R_6$. The parallel circuit is connected to ends of the resistors $R_4$ and $R_5$ other than the ends thereof connected to the junction point. The parallel circuit has its one end grounded via the capacitor $C_1$ and has its other end grounded via a series connection of the capacitors $C_3$ and $C_4$, the junction point of which is connected to the capacitor $C_5$.

If, with the oscillation circuit 13, the logical signal from an input terminal 41 is high (H), the transistor Tr is turned off to generate a recording superposition signal in a connector $I_{LCC}$ via the capacitor $C_5$. Conversely, if the logical signal at the input terminal is low (L), the transistor TR is turned on to stop generating the recording superposition signal.

Figure 10:
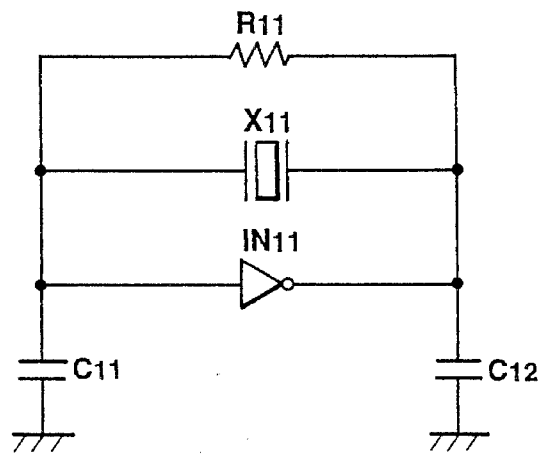
FIG. 10 is a circuit diagram showing another concrete example of a superposition circuit.
Figure 11:
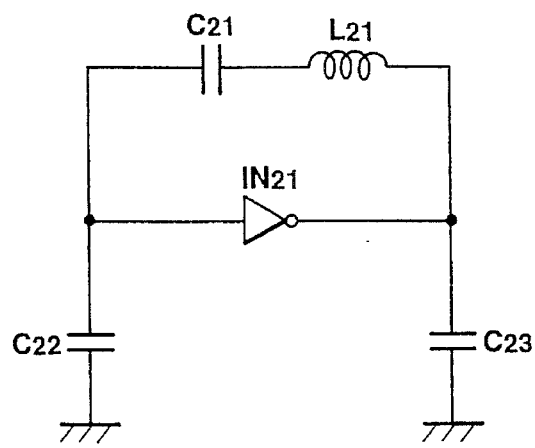
FIG. 11 is a circuit diagram showing a further concrete example of a superposition circuit.
Figure 12:
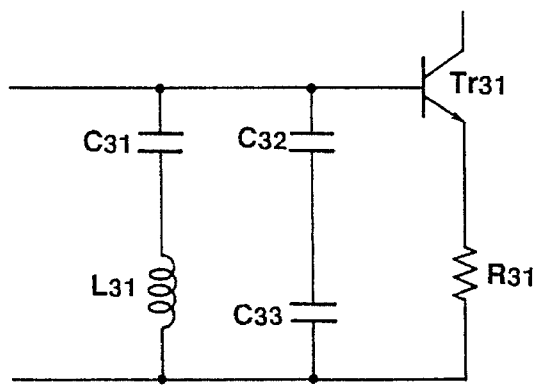
FIG. 12 is a circuit diagram showing a still further concrete example of a superposition circuit.

FIGS. 10 to 12 illustrate modifications of the oscillating circuit 13. In the modification shown in FIG. 10, a resistor $R_{11}$, a ceramic or quartz oscillator $X_{11}$ and an invertor $IN_{11}$ are connected in parallel with one another and the resulting parallel circuit is grounded via capacitors $C_{11}$ and $C_{12}$. The ceramic or quartz oscillator plays the part of producing the superposition signal by oscillation.

In the modification shown in FIG. 11, an LC circuit comprised of a capacitor $C_{21}$ and an inductance $L_{21}$ is connected in parallel with an invertor $IN_{21}$ and the resulting parallel circuit is grounded via two capacitors $C_{32}$ and $C_{33}$. The LC circuit plays the part of generating the superposition signal.

In the modification shown in FIG. 12, an LC circuit consisting of a capacitor $C_{31}$ and an inductance $L_{31}$ and a series connection of capacitors $C_{32}$ and $C_{33}$ are connected in parallel with each other and with a base-emitter passage of a transistor $Tr_{31}$ via a resistor $R_{31}$. The transistor $Tr_{31}$ plays the part of producing the superposition signal by oscillation.

Thus, with the superposition circuit shown in FIG. 8, the superposition signal is produced by oscillation using the ceramic or quartz oscillator. On the other hand, with the superposition circuits shown in FIGS. 9 and 10, the superposition signal is produced by the LC circuit and by the transistor, respectively.

What is claimed is:

1. A recording apparatus for a magneto-optical recording medium comprising:

a semiconductor laser device for radiating a laser beam to the magneto-optical recording medium, a driving circuit having an automatic power control circuit which tries to supply a constant power level driving signal to said semiconductor laser device during recording of information on the magneto-optical recording medium, and an oscillating circuit for generating high-frequency signals superposed on the constant power level driving signal from said driving circuit during recording of information on the magneto-optical recording medium, said high-frequency signals being of a frequency twice a predetermined maximum recording frequency of the signals being recorded on the magneto-optical recording medium, wherein said semiconductor laser device is supplied with a signal which is said constant power level driving signal from said driving circuit superposed on by high-frequency signals from said oscillating circuit.

2. The recording apparatus as claimed in claim 1 wherein said high frequency signals are signals having a frequency not lower than 5 MHz.

3. The recording apparatus as claimed in claim 1 wherein said high frequency signals are superposed on the constant power level driving signal from said driving circuit while the semiconductor laser device is operating in a non-saturated state.

4. A recording apparatus for a magneto-optical recording medium comprising:

a semiconductor laser device for radiating a laser beam to the magneto-optical recording medium, a driving circuit for supplying a driving signal to said semiconductor laser device, and an oscillating circuit for generating high-frequency signals superposed on the driving signal from said driving circuit, said high-frequency signals being of a frequency twice a predetermined maximum recording frequency and not lower than 5 MHz and superposed on said driving signal from said driving circuit at a ratio of 10 to 20 %, wherein said semiconductor laser device is supplied with a signal which is said driving signal from said driving circuit superposed on by high-frequency signals from said oscillating circuit.

5. A recording and/or reproducing apparatus for a magneto-optical recording medium comprising:

a semiconductor laser device for radiating a laser beam to the magneto-optical recording medium, a driving circuit for supplying a driving signal to said semiconductor laser device, a first oscillating circuit for generating first high-frequency signals superposed on the driving signal from said driving circuit during recording on the magneto-optical recording medium, said high-frequency signals being of a frequency twice a predetermined maximum recording frequency of the signals being recorded on the magneto-optical recording medium, and a second oscillating circuit for generating second high-frequency signals superposed on the driving signal from said driving circuit during reproduction from the magneto-optical recording medium, said high-frequency signals being of a frequency different from that of said first high-frequency signals, wherein said semiconductor laser device is fed during recording and during reproduction with signals which are the driving signals from said driving circuit superposed on by the first high frequency signals from said first oscillating circuit and with signals which are the driving signals from said driving circuit superposed on by the second high frequency signals from said second oscillating circuit, wherein during recording, a perpendicular magnetic field modulated in accordance with recording data is applied to said magneto-optical recording medium and simultaneously a light beam is radiated on said recording medium for recording data thereon, and wherein during reproduction, as a light beam is radiated to said magneto-optical recording medium, data recorded on said magneto-optical recording medium are read out based on the return light from the recording medium.

6. The recording and/or reproducing apparatus as claimed in claim 5 wherein said first high frequency signals are signals having a frequency not lower than five MHz and wherein said second high frequency signals are signals having a frequency of at least three hundred MHz.

7. The recording and/or reproducing apparatus as claimed in claim 1 wherein said first high frequency signals are signals having a frequency of at least five MHz and superposed at a ratio of 10 to 20% on the driving signals from said driving circuit, and wherein said second high frequency signals are signals having a frequency of at least three hundred MHz.

8. The recording and/or reproducing apparatus as claimed in claim 5 wherein said first and second oscillation circuits are connected to said semiconductor laser device via respective coupling capacitors.

* * * * *